United States Patent
Chow et al.

(10) Patent No.: US 12,068,922 B2
(45) Date of Patent: Aug. 20, 2024

(54) PROCESSING CHAINING IN VIRTUALIZED NETWORKS

(71) Applicant: Nokia Technologies Oy, Espoo (FI)

(72) Inventors: Hungkei Chow, Livingston, NJ (US); Michael Jarschel, Oberhaching (DE); Hasanin Harkous, Munich (DE); Padmavathi Sudarsan, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 18/066,638

(22) Filed: Dec. 15, 2022

(65) Prior Publication Data

US 2023/0224221 A1 Jul. 13, 2023

(30) Foreign Application Priority Data

Jan. 7, 2022 (FI) .................................... 20225008

(51) Int. Cl.
*H04L 41/0895* (2022.01)
*H04L 41/0893* (2022.01)
*H04L 41/0897* (2022.01)

(52) U.S. Cl.
CPC ...... *H04L 41/0895* (2022.05); *H04L 41/0893* (2013.01); *H04L 41/0897* (2022.05)

(58) Field of Classification Search
CPC ............. H04L 41/0893; H04L 41/0894; H04L 41/0895; H04L 41/0896; H04L 41/0897; H04L 41/08
USPC ......................................................... 709/220
See application file for complete search history.

(56) References Cited

U.S. PATENT DOCUMENTS

| | | | |
|---|---|---|---|
| 10,110,431 B2 * | 10/2018 | Ganichev | ................ H04L 49/35 |
| 10,180,850 B1 | 1/2019 | Kasat et al. | |
| 10,635,469 B2 | 4/2020 | Nair | |
| 11,888,736 B2 * | 1/2024 | Jain | ........................ H04L 45/306 |

(Continued)

FOREIGN PATENT DOCUMENTS

| | | | | |
|---|---|---|---|---|
| EP | 2985951 A1 * | 2/2016 | ......... | H04L 41/0806 |
| EP | 3358463 B1 | 9/2020 | | |

(Continued)

OTHER PUBLICATIONS

Neugebauer et al., "Understanding PCIe performance for end host networking", Proceedings of the 2018 Conference of the ACM Special Interest Group on Data Communication, Aug. 2018, pp. 327-341.

(Continued)

*Primary Examiner* — Hee Soo Kim
(74) *Attorney, Agent, or Firm* — Nokia Technologies Oy

(57) ABSTRACT

To dynamically allow chaining of logical processing units comprising endpoints, at least a type of an endpoint, and address information whereto connect the endpoint is configured, wherein the type of the endpoint is either a host port type or a logical processing unit type. During offloading from a central processing unit one or more functions to be performed by at least one further processing unit, the central processing unit is interacting with the one or more logical processing units via endpoints of the host port type and logical processing units are interacting via endpoints of the logical processing unit port type, the interaction using the address information.

13 Claims, 4 Drawing Sheets

(56) References Cited

U.S. PATENT DOCUMENTS

| | | | |
|---|---|---|---|
| 2015/0326473 A1* | 11/2015 | Dunbar | H04L 12/4633 370/392 |
| 2015/0372840 A1* | 12/2015 | Benny | H04L 61/2592 370/409 |
| 2018/0191838 A1* | 7/2018 | Friedman | H04L 41/0895 |
| 2018/0285009 A1 | 10/2018 | Guim Bernat et al. | |
| 2019/0109793 A1 | 4/2019 | Dalal | |
| 2019/0266088 A1 | 8/2019 | Kumar | |
| 2019/0317802 A1* | 10/2019 | Bachmutsky | G06F 9/5044 |
| 2019/0379572 A1* | 12/2019 | Yadav | H04L 41/12 |
| 2020/0099625 A1* | 3/2020 | Yigit | H04L 45/302 |
| 2020/0136906 A1 | 4/2020 | Guim Bernat et al. | |
| 2020/0274945 A1* | 8/2020 | Rolando | H04L 67/10 |
| 2021/0117360 A1 | 4/2021 | Kutch et al. | |

FOREIGN PATENT DOCUMENTS

| | | | | |
|---|---|---|---|---|
| WO | 2020/226979 A2 | 11/2020 | | |
| WO | 2021/102257 A1 | 5/2021 | | |
| WO | 2021/257411 A1 | 12/2021 | | |
| WO | WO-2023168461 A2 * | 9/2023 | | H04L 41/0806 |

OTHER PUBLICATIONS

"O-RAN Acceleration Abstraction Layer General Aspects and Principles", O-Ran Alliance, O-RAN.WG6.AAL-GAnP-v01.00, 2021, pp. 1-53.

"P4 Open Source Programming Language", P4, Retrieved on Dec. 9, 2022, Webpage available at : https://p4.org/.

Shantharama et al., "Hardware-Accelerated Platforms and Infrastructures for Network Functions: A Survey of Enabling Technologies and Research Studies", IEEE Access, vol. 8, Jul. 9, 2020, pp. 132021-132085.

Linguaglossa et al., "Survey of Performance Acceleration Techniques for Network Function Virtualization", Proceedings of the IEEE, vol. 107, No. 4, Apr. 2019, pp. 746-764.

Office action received for corresponding Finnish Patent Application No. 20225008, dated Mar. 22, 2022, 10 pages.

"Network Functions Virtualisation (NFV); Acceleration Technologies; Report on Acceleration Technologies & Use Cases", ETSI GS NFV-IFA 001, V1.1.1, Dec. 2015, pp. 1-38.

AvidThink, "Myth-busting DPDK in 2020", Rev B., dated 2020.

Office action received for corresponding Finnish Patent Application No. 20225008, dated Mar. 17, 2023, 10 pages.

Extended European Search Report received for corresponding European Patent Application No. 22214031.1, dated May 10, 2023, 12 pages.

Zhang et al., "Service Chaining for Heterogeneous Middleboxes", International Conference on Field-Programmable Technology (ICFPT), Dec. 9-11, 2020, pp. 263-267.

* cited by examiner

PROCESSING CHAINING IN VIRTUALIZED NETWORKS

TECHNICAL FIELD

Various example embodiments relate to wireless communications.

BACKGROUND

Wireless communication systems are under constant development. For example, network functions are increasingly implemented as virtualized network functions, in which the network functions are separated from hardware they run on by using virtual hardware abstraction. The hardware that supports virtualization may be commercial off-the-shelf platforms. To further increase performance and reduce power consumption, some of the functions may be offloaded from a general central processing unit to one or more hardware accelerators, that are specialized processing units.

SUMMARY

According to an aspect there is provided an apparatus comprising at least one central processing unit; at least one further processing unit; at least one memory including computer program code, the at least one memory and computer program code being configured to, with the processing units, cause the apparatus at least to perform: querying from the at least one further processing unit, per a further processing unit, information relating to chaining possibilities of logical processing units in a pipeline abstraction instantiated, said information queried comprising at least a number of ports and per a port address information and information on a direction of the port; configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and offloading from the at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

In an embodiment, the instantiated pipeline abstraction associates endpoints with one or more supported interface types and wherein the at least one memory and computer program code configured to, with the processing units, cause the apparatus at least to perform: configuring, per an endpoint, an interface type to the endpoint based on the interface types in the instantiated pipeline abstraction.

In an embodiment, the at least one memory and computer program code are configured to, with the processing units, cause the apparatus at least to perform: allowing data insertion from the at least one central processing units via an endpoint having interface type supporting data to be inserted; and allowing data retrieval via an endpoint having interface type supporting data to be retrieved.

In embodiments, the at least one memory and computer program code are configured to, with the processing units, cause the apparatus at least to perform: determining, when a direction of an endpoint provides an ingress interface, the interface type from a group comprising at least a burst data queue interface type allowing data to be transferred in a block with configurable size, a streaming data interface type allowing data to be transferred in a fixed size and in a fixed interval, the size and the interval being configurable, and a timing/clocking interface type, allowing use of a timing signal with configurable frequency and duty cycle; determining, when a direction of an endpoint provides an egress interface, the interface type from a group comprising the burst data queue interface type, the streaming data interface type, the timing/clocking interface type and an asynchronous event/data queue with callback interface type allows transfer of data/event asynchronously when the data/event is available and includes a pre-registered callback function that is called when the data/event is available.

In embodiments, the at least one memory and computer program code are configured to, with the processing units, cause the apparatus at least to perform the configuring over an application programming interface.

In embodiments, the at least one memory and computer program code are configured to, with the processing units, cause the apparatus at least to perform, prior to instantiating the pipeline abstraction: checking, in response to receiving an instantiation request comprising a pipeline abstraction, implementation options for the pipeline abstraction; selecting, when two or more implementation options are found during the checking, one of the implementation options; and instantiating the pipeline abstraction using selected implementation option.

In embodiments, the at least one memory and computer program code are configured to, with the processing units, cause the apparatus at least to perform, prior to instantiating the pipeline abstraction: checking, in response to receiving an instantiation request comprising a pipeline abstraction, implementation options for the pipeline abstraction; causing forwarding, when two or more implementation options are found during the checking, the implementation options towards an apparatus wherefrom the pipeline abstraction originated; receiving information on a selected implementation option amongst the two or more implementation options; and instantiating the pipeline abstraction using the selected implementation option.

In embodiments, the pipeline abstraction represents the two or more implementation options in a uniform way.

In embodiments, the at least one memory and computer program code are configured to, with the processing units, cause the processing units to establish direct physical connections for the interaction.

According to an aspect there is provided a method comprising: querying from at least one further processing unit, per a further processing unit, information relating to chaining possibilities of logical processing units in a pipeline abstraction instantiated, said information queried comprising at least a number of ports and per a port address information and information on a direction of the port; configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and offloading from at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

In an embodiment, the method further comprises: configuring, per an endpoint, an interface type to the endpoint based on the interface types in the instantiated pipeline abstraction.

In an embodiment, the method further comprises: allowing data insertion from the at least one central processing units via an endpoint having interface type supporting data to be inserted; and allowing data retrieval via an endpoint having interface type supporting data to be retrieved.

According to an aspect there is provided a computer readable medium comprising program instructions stored thereon for performing at least following: querying from at least one further processing unit, per a further processing unit, information relating to chaining possibilities of logical processing units in a pipeline abstraction instantiated, said information queried comprising at least a number of ports and per a port address information and information on a direction of the port; configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and offloading from at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

In an embodiment, the computer readable medium is a non-transitory computer readable medium.

According to an aspect there is provided a computer program comprising instructions for performing at least following: querying from at least one further processing unit, per a further processing unit, information relating to chaining possibilities of logical processing units in a pipeline abstraction instantiated, said information queried comprising at least a number of ports and per a port address information and information on a direction of the port; configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and offloading from at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

Figure 1:
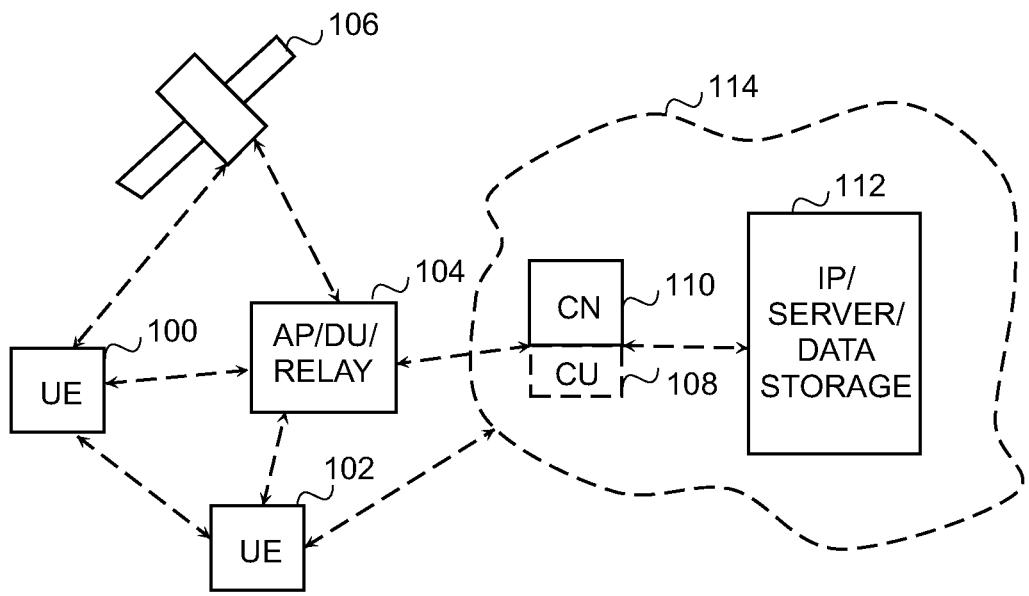
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilise cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
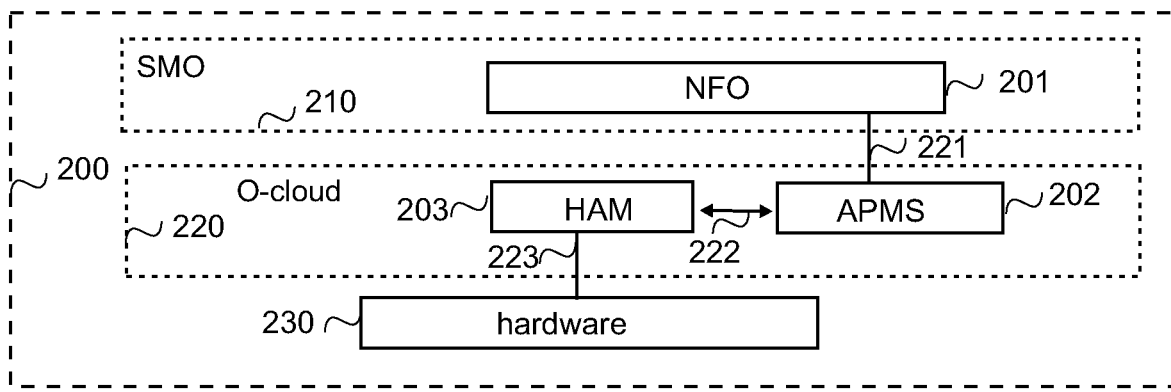
FIG. 2 illustrates an exemplified cloud architecture.

FIG. 2 illustrates a high-level view of entities in a cloud architecture supporting hardware acceleration. Referring to FIG. 2, the cloud architecture 200 comprises a service management and orchestration framework (SM 0) 210 and an open cloud 220, the open cloud 220 providing an abstraction platform to separate abstractions of network functions from the processing hardware 230. It should be appreciated that the cloud architecture may comprise also other elements not disclosed herein.

For a hardware acceleration pipeline, the service management and orchestration framework 210 comprises one or more network function orchestrators (NFO) 201. A network function orchestrator 201 is a functional entity to manage a plurality of network functions that provide network services and/or contribute to network services by providing one or more parts of network services. The network function orchestrator 201 comprises different functions, for example instantiation of network services, by means of which the network function orchestrator 201 can manage network functions. The network function orchestrator 201 has, per a network service to be instantiated, information about hardware accelerators within its processing pipeline for one or more network functions involved in the network service.

The open cloud 220 hosts cloudified network functions and comprises one or more accelerator pipeline management service APMS entities 202 and one or more hardware accelerator manager entities 203. An accelerator pipeline management service entity 202 provides deployment management services, interacting over an interface 221 with one or more network function orchestration entities 201 and over an internal interface 222 with one or more hardware accelerator manager HAM entities 203. A hardware accelerator manager entity 203 manages interaction over an interface 223 with the hardware accelerators 230.

The hardware accelerator 230 may comprise, for example, one or more hardware apparatuses comprising different general purpose processors, or other commercial off-the-shelf devices or platforms and application programming interfaces between the devices and platforms. A non-limiting list of hardware for hardware accelerators includes a central processing unit, a graphics processing unit, a data processing unit, a neural network processing unit, a field programmable gate array, a graphics processing unit based system-on-a-chip, a field programmable gate arrays based system-on-a-chip, a programmable application-specific integrated circuit and a smartNIC, which is a programmable network adapter card with programmable accelerators and Ethernet connectivity.

In 5G and beyond 5G, it is envisaged that hardware acceleration with corresponding abstraction models is used with the edge cloud. The abstraction models are utilizing logical processing units to represent hardware accelerators to which some network functions, or one or more parts of network functions, may be offloaded.

Figure 3:
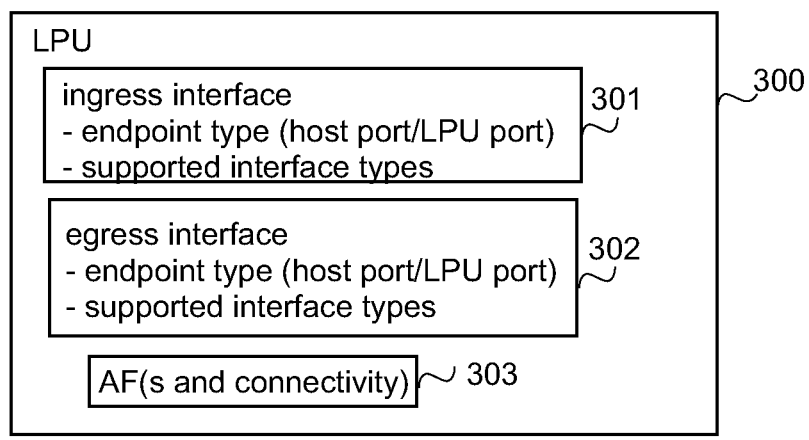
FIG. 3 illustrates an example of a logical processing unit.

FIG. 3 illustrates an example of a logical processing unit LPU 300, or more precisely, basic building blocks of the logical processing unit 300 representing resources within an instance of a network device (hardware device) providing one or more services. It should be appreciated that one logical processing unit may represent a network device that comprises multiple subsystems. Using the basic building blocks it is possible to represent heterogenous types of a hardware accelerator in a uniform way, for example in a pipeline abstraction, examples of which are described below. Examples of heterogenous types include different implementations of a set of acceleration functions, and a same set of acceleration functions from different vendors, a set comprising one or more acceleration functions.

Referring to FIG. 3, the logical processing unit 300 comprises one or more ingress interfaces 301, one or more egress interfaces 302 and one or more accelerator functions 303, and if there are two or more accelerator functions, connectivity between functions, or between two accelerator functions. The connectivity may be a static connectivity, which is predefined (configured) while an abstraction model is defined, or a semi-static connectivity, that is programmable (or reconfigurable, changeable) via an application programming interface, for example. An interface, be that an ingress interface 301 or an egress interface 302, is associated with an endpoint type, the endpoint type being in the illustrated examples either a host port or a logical processing unit (LPU) port. The endpoint type provides a possibility to chain offloaded logical processing unit instances while allowing the main process to insert or retrieve data within a chain, as will be described in more detail with FIGS. 8 and 9. The connectivity between different accelerator functions, if any exists, and/or the definitions 301 of the ingress interface(s) and/or the definitions 302 of the egress interface(s) may be static, i.e. configured while an abstraction model is defined, or semi-static, i.e. programmable via an application programming interface.

Further, the one or more supported interface types depend on the abstracted network device. An ingress interface may be configured to support a burst data queue interface type, or a streaming data interface type, or a timing/clocking interface type. An egress interface may be configured to support the burst data queue interface type, or the streaming data interface type, or the timing/clocking interface type, or an asynchronous event/data queue with callback interface type. The burst data queue interface type allows data to be transferred in a block with configurable size. The streaming data interface type allows data to be transferred in fixed size and in fixed interval, both size and interval being configurable. The timing/clocking interface type allows use of a timing signal with configurable frequency and duty cycle. The asynchronous event/data queue with callback allows transfer of data/event asynchronously when the data/event is available and includes a pre-registered callback function that is called when the data/event is available.

Figure 4:
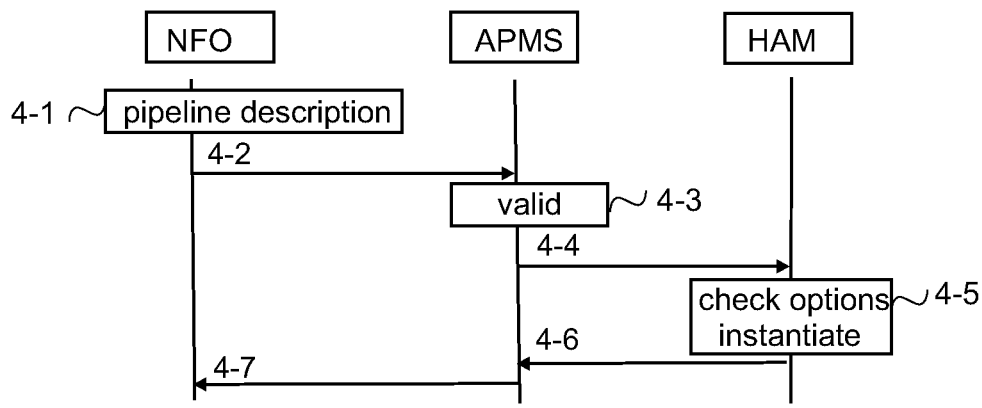
FIGS. 4 to 6 illustrate examples of information exchange.
Figure 5:
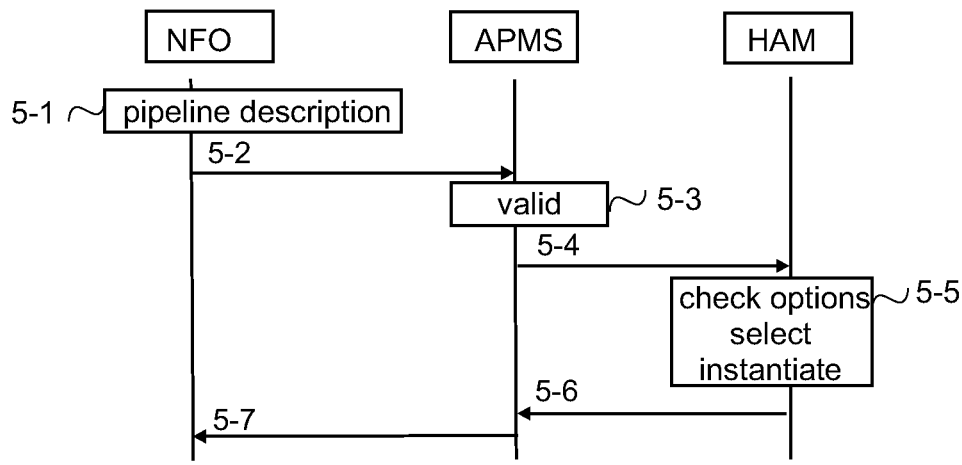
Figure 6:
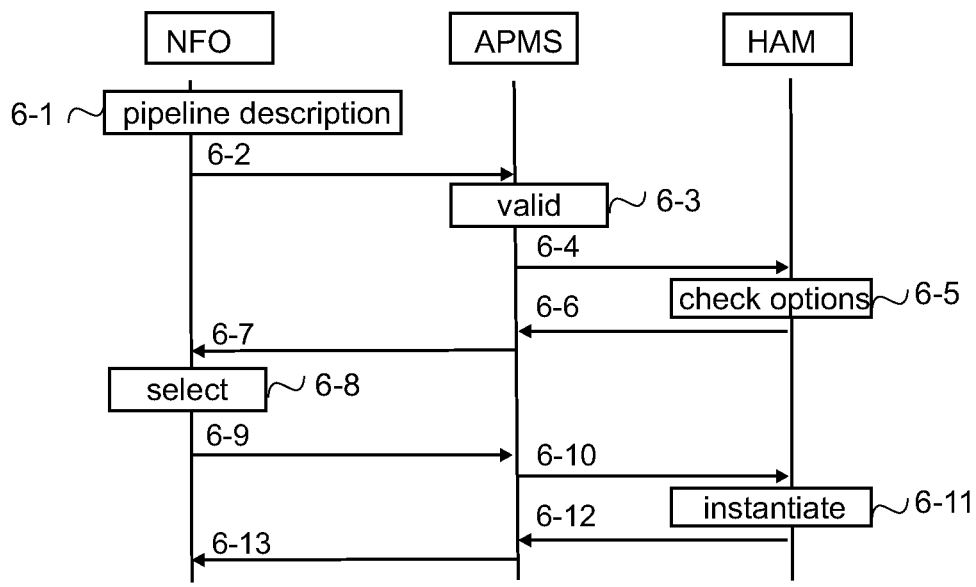

FIGS. 4 to 6 illustrate different examples of information exchange sequences of a pipeline instantiation on a management plane of hardware accelerators using the cloud architecture illustrated in FIG. 2. The functionality may be triggered in response to a new hardware being added to the network, or a new deployment of a hardware, in order a network management system to discover capabilities of the new hardware or the new deployment, or a new service request being received.

Referring to FIG. 4, the network function orchestrator NFO detects in block 4-1 need for a network service and provides in block 4-1 a description file, which contains a pipeline abstraction. The pipeline abstraction provides accelerator types and a sequence of accelerators. The description file may be, for example, in JSON (JavaScript Object Notation) format, or in YAML format. (YAML is a human-readable data-serialization language.) The NFO then requests (message 4-2) a pipeline instantiation using an accelerator pipeline management service APMS. Message 4-2 may be an "Acceleration pipeline instantiation request". The APMS checks in block 4-3 the validity of the request, i.e. the validity of the description file. If the description is invalid, an error is returned to the NFO. However, in the illustrated example it is assumed, that the description file is valid, and the APMS creates (message 4-4) an instantiation request (o-cloud internal instantiation request) towards a hardware accelerator manager HAM. Message 4-4 may be an "Abstract pipeline request". Upon receiving the request (message 4-4), the HAM checks in block 4-5 its internal inventory, for example a memory in the HAM, for possible instantiation options. A non-limiting list of examples of instantiation options include various capabilities and predefined configurations of the underlying hardware accelerators. In other words, the HAM performs o-cloud internal pipeline mapping by finding out capabilities of the underlying hardware, for example support of providing input directly to another hardware accelerator, or have memory required for some accelerator function, and/or otherwise ensure that the logical structure of the pipeline can be deployed in the hardware. In other words, in block 4-5 discovery is allowed. In the illustrated example it is assumed that one option is found, and hence the HAM proceeds in block 4-5 with the instantiation, i.e. instantiates the pipeline. The HAM then returns, via the APMS (message 4-6, message 4-7) to the NFO a set of addresses for data insertion and/or for data retrieval on which addresses the NFO can operate. Message 4-6 and message 4-7 may be "Addresses of requested pipeline data insertion/retrieval points".

If the HAM finds in block 4-5 no possible instantiation option, it does not proceed with the instantiation, but would inform via the APMS that the pipeline abstraction cannot be instantiated. In such a case, message 4-6 and message 4-7 may be "NACK of pipeline instantiation request".

The information exchange illustrated in FIGS. 5 and 6 differ from the one illustrated in FIG. 4 in that the HAM, when checking the internal instantiation options founds more than one option.

Referring to FIG. 5, blocks 5-1 and 5-3 correspond to blocks 4-1 and 4-3 described with FIG. 4, and messages 5-2 and 5-4 corresponds to messages 4-2 and 4-4 described with FIG. 4, and are not repeated in vain herein. The HAM checks in block 5-5 its internal inventory for possible instantiation options. Since in the illustrated example two or more instantiation options are found in block 5-5, the HAM selects in block 5-5 one of the options, based on its internal policy. A nonlimiting list of internal policy includes minimizing overall energy consumption and maximizing performance. The HAM then proceeds in block 5-5 with the instantiation of the selected option, and returns, via the APMS (message 5-6, message 5-7) to the NFO a set of addresses for data insertion and/or for data retrieval on which addresses the NFO can operate. Messages 5-6 and 5-7 correspond to message 4-6 and 4-7.

Referring to FIG. 6, blocks 6-1 and 6-3 correspond to blocks 4-1 and 4-3 described with FIG. 4, and messages 6-2 and 6-4 corresponds to messages 4-2 and 4-4 described with FIG. 4, and are not repeated in vain herein. The HAM checks in block 6-5 its internal inventory for possible instantiation options. Since in the illustrated example two or more instantiation options are found in block 6-5, the HAM forwards the options to the NFO via the APMS (messages 6-6, 6-7). Messages 6-6 and 6-7 may be "Alternative mapping options". The NFO selects, using a policy specified in the NFO, in block 6-8 one of the options, and forwards information on the selected option via the AMPS (messages 6-9, 6-10) to the HAM. The policy may be one of the policies given above as examples. Messages 6-9 and 6-10 may be "Acknowledgement of preferred mapping". Upon receiving the information on the selected option, the HAM instantiates in block 6-11 the selected option. The HAM then returns, via the APMS (message 6-12, message 6-13) to the NFO a set of addresses for data insertion and/or for data retrieval on which addresses the NFO can operate. Messages 6-12 and 6-13 may be "Addresses of preferred pipeline data insertion/retrieval points".

Figure 7:
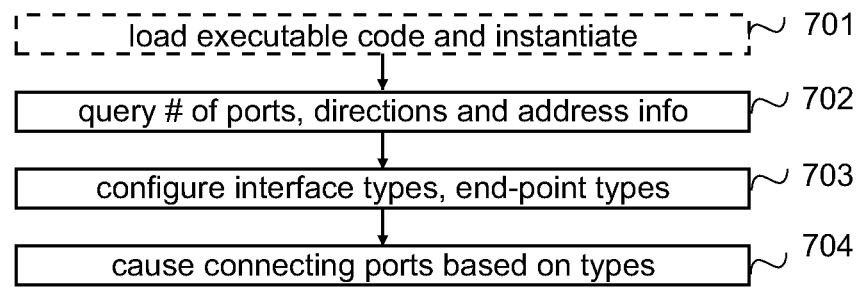
FIG. 7 is a flow chart illustrating example functionality.

FIG. 7 illustrates a functionality of a hardware apparatus, or more precisely, an application program running on the hardware apparatus. The functionality described in blocks 702 to 704 may be performed once the hardware accelerator manager has instantiated the pipeline abstraction, i.e. separately from functionality disclosed in block 701.

Referring to FIG. 7, an executable code is loaded in block 701 to the hardware apparatus via a management interface between the hardware accelerator manager and the hardware apparatus and instantiated in block 701. The executable code may be a kernel code or a firmware executable code. The executable code is a low level code that defines available ports and acceleration functions, enabling capabilities of the hardware accelerator. It should be appreciated that the executable code may be loaded to the hardware apparatus and instantiated when needed, or loaded earlier, in which case it is stored to the hardware apparatus. When the executable code has been loaded and instantiated, the hardware apparatus queries in block 702, via an application programming interface, for example via an acceleration adaptation layer interface (AALI), the number of ports, their identifiers, directions (egress or ingress) and possible port related configurations. For example, the application program may use in block 702 a generic query function call in the application programming interface. The hardware apparatus, (the application program running in the hardware apparatus), then configures, including changing configurations, if needed, in block 703 the processing chain of logical processing unit(s), by defining, per an endpoint (representing a port), its endpoint type, its interface type, and address information indicating with which port to connect, and by commanding to apply the configuration. The application program may use in block 703 one or more configuration entity calls in the application programming interface. The processing chain is then created by causing connecting ports in block 704 the ports based on the end-point types and address information in the configuration. For example, the application program may use in block 704 a generic connect command call in the application programming interface. In other words, a port is connected to an acceleration function within a logical processing unit, or to a port on another logical processing unit.

Figure 8:
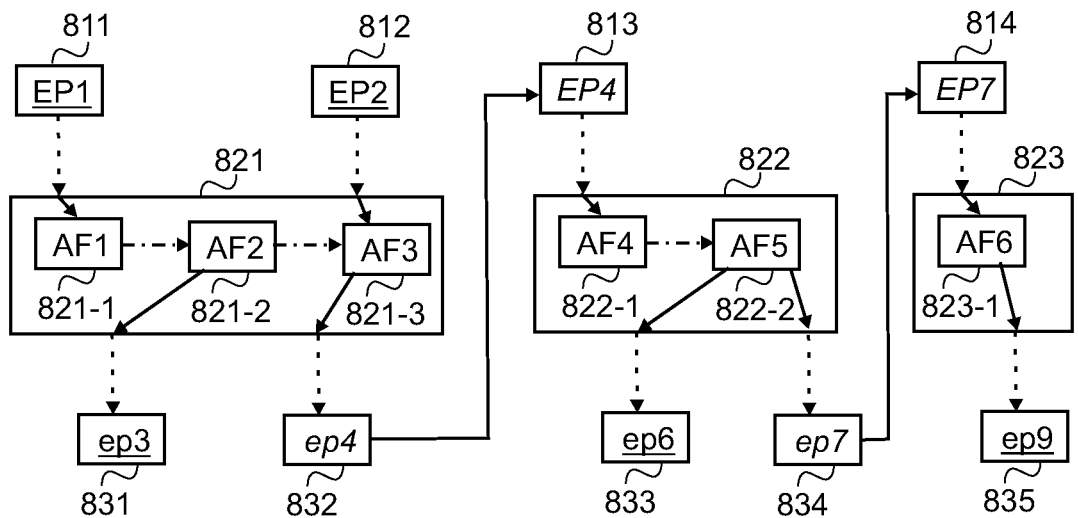
FIG. 8 illustrates an example of chained logical processing units.

FIG. 8 illustrates an example of chained logical processing units, for example for a data flow, created and configured in a data plane processing, via the application programming interface, by the application program, as described with FIG. 7.

Referring to FIG. 8, three logical processing units 821, 822, 823 have been chained, the logical processing units having ingress points depicted above the logical processing units with uppercase letters EP for ingress endpoints, and egress endpoints depicted below the logical processing units with lowercase letters ep for egress endpoints, the endpoint type of host port being depicted by underlined letters and the endpoint type of logical processing unit port being depicted by italic letters.

Referring to FIG. 8, a first logical processing unit 821 comprises three different acceleration functions AF1 821-1, AF2 821-2 and AF3 821-3 connected together in series, according to predefined connectivity. Further, the first logical processing unit 821 has two ingress endpoints EP1 811, EP2 812, both being host ports meaning that a host application can insert data to a corresponding acceleration function. The first logical processing unit 821 has also two egress endpoints ep3 831 and ep4 832, one 831 of which is a host port and another 832 is a logical processing unit port. This means that processed data may be retrieved from endpoint 831, whereas the other endpoint 832 provides data to be inserted to an acceleration function in another interface.

A second logical processing unit 822 comprises two different acceleration functions AF4 822-1 and AF5 822-2, connected together in series. Further, the second logical processing unit has in the illustrated example only one ingress endpoint EP4 813, which is a logical processing unit port, inserting data outputted by the first logical processing unit. The second logical processing unit 822 has also two egress endpoints ep6 833 and ep7 834, one 833 of which is a host port and another 834 is a logical processing unit port. This means that processed data may be retrieved from endpoint 833, whereas the other endpoint 834 provides data to be inserted to an acceleration function in another interface.

A third logical processing unit 823 comprises one acceleration function AF6 823-1. Further, the third logical processing unit has in the illustrated example only one ingress endpoint EP7 814, which is a logical processing unit port, inserting data outputted by the second logical processing unit. The third logical processing unit 823 has also one egress endpoint ep9 835 which is a host port.

For example, assuming that interface types defined for the different endpoints are the burst data queue for the EP1, the timing/clocking interface for the EP2, the asynchronous data for the EP3 and EP6 and streaming data for the EP9, a host application could insert burst data over the EP1, and a timing signal over the EP2, and retrieve asynchronous data indicating alert over the EP3 and EP6, and streaming output data over the EP9.

As can be seen from the illustrated example of FIG. 8, a logical processing unit may comprise one or more acceleration functions. Further, it should be appreciated that there may be one or more logical processing units, and there may be one or more chains of logical processing unit, a chain meaning that an egress endpoint of a logical processing unit is connected to an ingress endpoint of another logical processing unit, the chain starting with a logical processing unit having ingress endpoints of host port types only and ending with a logical processing unit having egress endpoints of host port types only.

It should be appreciated that the second logical processing unit, as well as the third logical processing unit may comprise more than one ingress endpoint, which may be of the host port type. In other words, there are no limitations to the number of endpoints and their type.

Figure 9:
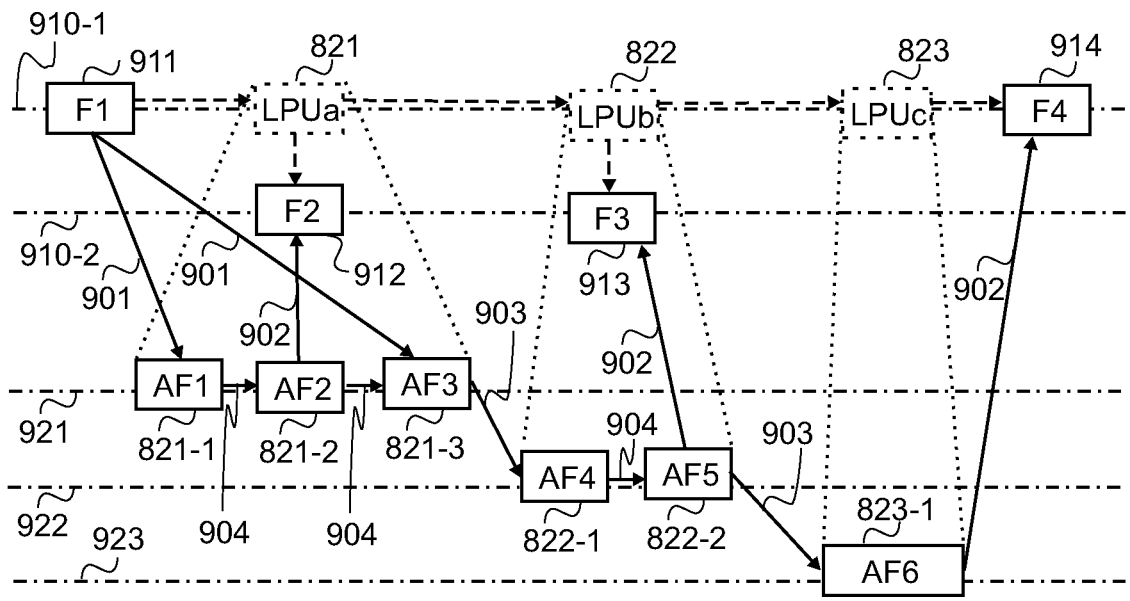
FIG. 9 illustrates hardware implementation principles of the example of FIG. 8.

FIG. 9 illustrates hardware implementation principles of the example of FIG. 8. In other words, it depicts a functional illustration how software processes running on a host processing unit may offload the processing to one or more other processing units (hardware accelerators) using the definitions of the instantiated model.

Referring to FIG. 9, the first logical processing unit 821 of FIG. 8 is denoted by LPUa, and its acceleration functions are denoted by AF1 821-1, AF2 821-2, and AF3 821-2. The second logical processing unit 822 of FIG. 8 is denoted by LPUb, and its acceleration functions are denoted by AF4 822-1 and AF5 822-2. The third logical processing unit 823 of FIG. 8 is denoted by LPUc, and its acceleration function is denoted by AF6 823-1.

In the example of FIG. 9, a multithreaded core is used. In the example it is assumed that there may be running a main process (parent process) and one or more child processes on a host processing unit. However, it should be appreciated that in another implementation there may be no child processes.

In other words, in FIG. 9, a main process running on a host processing unit, for example a host central processing unit, is illustrated on line 910-1 and a child process running on the host processing unit is illustrated on line 910-2. Further, in the illustrated example, there is a separate processing unit, for example a hardware accelerator, per an offloaded logical processing unit. However, it should be appreciated that two or more logical processing units may be offloaded to one hardware accelerator. In other words, two or more logical processing units may be representations (abstractions) of the one (same) acceleration hardware in two or more logical partitions. The process running on a hardware accelerator for the LPUa 821 is illustrated on line 921, the process running on a hardware accelerator for the LPUb 822 is illustrated on line 922 and the process running on a hardware accelerator for the LPUc 823 is illustrated on line 923. Further, in the illustrated example, different processes inserting (sending) data to or receiving (retrieving) data from offloaded logical processing units are depicted by functions denoted by F1 911 (sending data to two ingress endpoints within LPUa), F2 912 (retrieving data from one egress endpoint within LPUa), F3 913 (retrieving data from one egress endpoint within LPUb) and F4 914 (retrieving data from one egress endpoint within LPUc).

Connections, including direct physical connections, between different functions include "host to accelerator" connections 901, "accelerator to host" connections 902 and "accelerator to accelerator" connections 903, that were created (established) using a connect command in the example of FIG. 7, the connect command conveying the configuration to be used. The connect command hence instructs the processing units to transfer data to/from the host via direct memory access or to/from another processing unit. The connections 904 within a processing unit are preconfigured internal connections.

As can be seen from the example illustrated in FIG. 9, data returns to the host processing unit only when the host processing unit is the recipient, thanks to the port type definitions and address information. In other words, there is no need to bounce data back and forth between the host processing domain and one or more accelerator domains. Hence, processing latency caused by bouncing the data back and forth is avoided. Further, a transfer of data consumes power, and by avoiding the bouncing power can be saved.

The packet processing pipelines within a function running on the host processing unit or within an offloaded logical processing unit may be represented as a P4 target in an implementation in which a P4 language is used to define the processing pipelines illustrated in FIG. 9. By means of the P4 language logical processing pipelines are determined, the logical processing pipelines being translatable into any programming language or configuration parameters, which a hardware accelerator supports, and can use to implement a corresponding processing pipeline.

Figure 10:
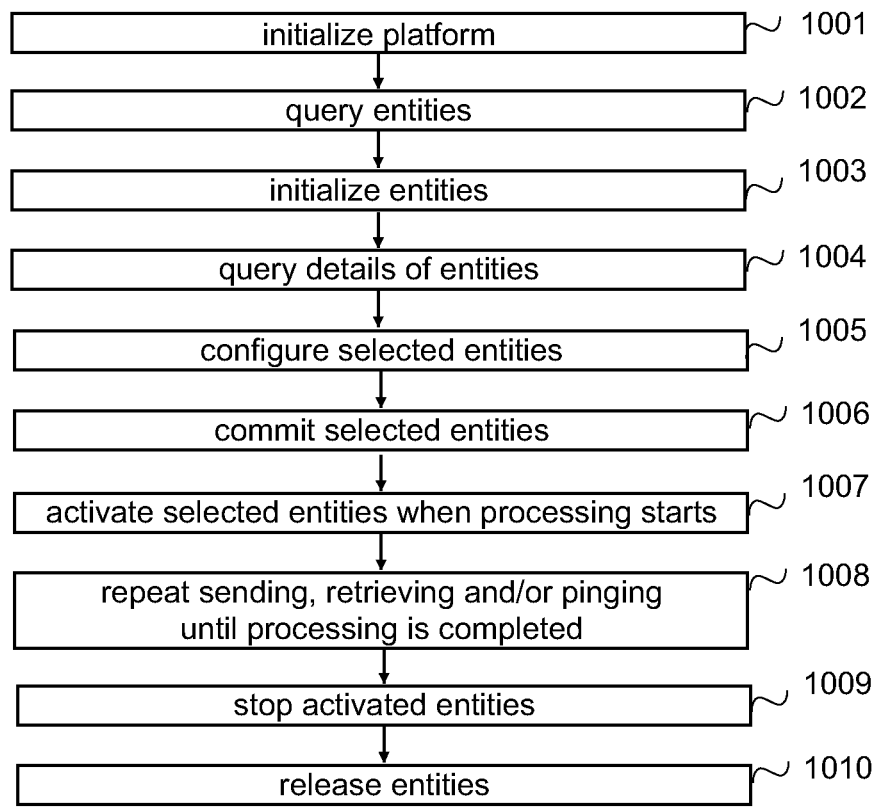
FIG. 10 is a flow chart illustrating another example functionality.

FIG. 10 is a flowchart illustrating an example of interaction over the application programming interface, for example in an apparatus, between one or more main application processes running in the host processing unit and a hardware abstraction layer in view of the hardware abstraction layer.

Referring to FIG. 10, a hardware accelerator platform is initialized in block 1001. Block 1001 may include receiving an application programming interface, API, function "init_platform( )" without any information in the hardware abstraction layer and sending from the hardware abstraction layer an API function "init_platform_response( )" with a platform identifier.

Then entities are queried in block 1002. Entities are hardware accelerator instances, i.e. logical processing unit instances that are configurable via the application programming interface. Block 1002 may include receiving an API function "query_platform( )" with a platform identifier in the hardware abstraction layer, the identifier being the one sent in block 1001, and sending from the hardware abstraction layer an API function "query_platform_response( )" with information on a number of entities, and a list of entities disclosing, per an entity, for example entity identifier, type, state, etc. For example, using the example in FIGS. 8 and 9, information on LPUa, LPUb and LPUc may be sent.

Entities that are used in the processing pipeline are in the illustrated example initialized in block 1003. Block 1003 may include receiving for all entities, per an entity, an API function "init_entity( )" with corresponding entity identifier in the hardware abstraction layer and sending from the hardware abstraction layer an API function "init_entity_response( )" with information indicating whether initializing succeeded or failed.

The entities that were successfully initialized are queried in block 1004. Block 1004 may include receiving for the entities, per an entity, an API function "query_entity( )" with corresponding entity identifier in the hardware abstraction layer and sending from the hardware abstraction layer an API function "query_entity_response( )" with information on number of ports, a list of ports disclosing, per a port, for example port identifier, direction (input/output, or ingress/egress, ports), etc., number of functions (acceleration functions), and a list of functions disclosing, per a function, for example a function identifier, type, etc. The query response indicates both preconfigured internal connections and configurable connections.

In the illustrated example, entities with which the process is continued, are selected, by the application process based on the query response. It should be appreciated that all entities may be selected. The selected entities are configured in block 1005 by determining the configurations and receiving them in the hardware abstraction layer. Block 1005 may include receiving for selected entities an API function "configure_entity( )" with command with parameters that are to be refreshed (ptr_parameters) in the hardware abstraction layer, performing the configuration, and sending from the hardware abstraction layer an API function "configure_entity_ack( )" indicating whether the configuration succeeded. In the illustrated example it is assumed that the configuration succeeds. For example, the result of the configuration may be the chain illustrated in FIG. 8. The command with parameters may contain, for example, following: load_kernel, connect_ep, connect_port, setup_qos, setup_interface, etc., i.e. commands to realize a corresponding logical processing unit, or chains of logical processing units, the end result being a logical chain, for example such as illustrated in FIG. 8. In the example command ep means end point, a connect command may be from an LPU to the host, from the host to an LPU, or from an LPU to another LPU, qos means quality of service, and interface means interface type (of the supported interface types). This also causes the underlying hardware accelerators to establish direct physical connections.

Then the selected, and configured, entities are committed in block 1006. Block 1006 may include receiving, per an entity, an API function "commit_entity( )" with the entity identifier in the hardware abstraction layer and sending from the hardware abstraction layer an API function "commit_entity_response( )" with information on a state and one or more interface identifiers, etc. An interface identifier is an end point identifier for data insertion or data retrieval.

When the processing starts, selected entities are activated in block 1007. Block 1007 may include receiving, per an entity, an API function "activate_entity( )" with the entity identifier, the one or more interface identifiers, function identifier(s), etc. in the hardware abstraction layer and sending from the hardware abstraction layer an API function "activate_entity_ack( )" indicating whether the activation succeeded. In the illustrated example it is assumed that the activation succeeds. A function identifier refers to an acceleration function that has been selected, and if there are two or more function identifiers, it indicates that the acceleration functions are connected (preconfigured) inside an LPU (entity).

Then sending data and/or retrieving data and/or pinging entity procedures are repeated in block 1008 until processing is completed. Block 1008 may include receiving API functions "send_data( )" with the entity identifier, the interface identifier, and ptr data buffer (refresh data buffer) with data to be inserted, "retrieve_data( )" with the entity identifier, the interface identifier, and ptr data buffer, and "ping_entity ( )" with the entity identifier in the hardware abstraction layer, and sending from the hardware abstraction layer API functions "send_data_ack( )", "retrieve_data_response( )" with data retrieved, "ping_entity_response( )" with state of the entity and "entity_callback( )" with the entity identifier, the interface identifier and parameters to be refreshed.

When processing is completed, activated entities are stopped in block 1009 and then released in block 1010. Block 1009 may include, per an activated entity, receiving an API function "stop_entity( )" in the hardware abstraction layer and sending from the hardware abstraction layer an API function "stop_entity_ack( )". Block 1010 may include, per an activated entity, receiving an API function "release_entity( )" in the hardware abstraction layer and sending from the hardware abstraction layer an API function "release_entity_ack( )".

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted. Some of the blocks or part of the blocks or one or more pieces of information can also be left out or replaced by a corresponding block or part of the block or one or more pieces of information. Further, the different implementations described for a block may be freely combined with any of different implementations of another block.

Figure 11:
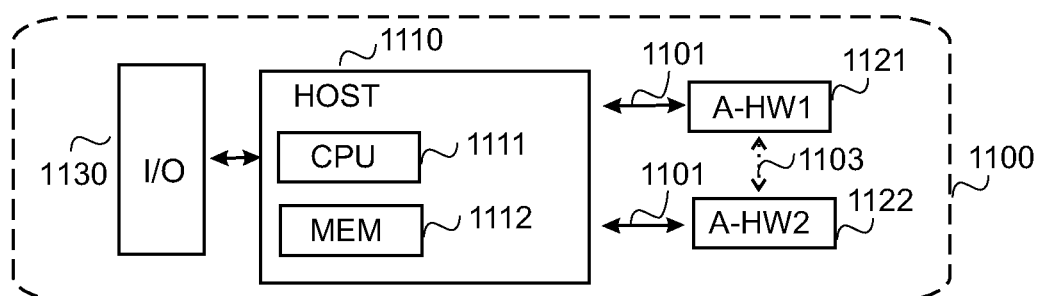
FIG. 11 is a schematic block diagram.

FIG. 11 illustrates an apparatus 1100 configured to provide a piece of hardware in or for a virtualized radio access network. The apparatus 1100 may be an electronic devices, examples being listed above with FIGS. 1 and 2. The apparatus comprises a host processing unit 1110, for example a central processing unit complex or a host server, comprising at least the central processing unit (CPU) 1111, such as at least one processor or processing circuitry, and at least one memory 1112 including a computer program code (software, algorithm), wherein the at least one memory and the computer program code (software, algorithm) are configured, with the at least one processor, to cause the apparatus to carry out any one of the embodiments, examples and implementations described above.

Referring to FIG. 11, the memory 1112 may be implemented using any suitable data storage technology, such as semiconductor based memory devices, flash memory, magnetic memory devices and systems, optical memory devices and systems, fixed memory and removable memory. The memory may comprise a configuration storage, for example for storing at least temporarily information on configurations of logical processing units. The memory 1112 may further store other data, such as a data buffer for data waiting to be processed.

The apparatus 1100 comprises hardware accelerator circuitries, depicted in the illustrated Figure with two hardware accelerator circuitries A-HW1 1121, A-HW2 1122. It should be appreciated that there may be any number of hardware accelerator circuitries. Different examples of hardware circuitries are listed above with FIG. 2. Ports of two or more hardware accelerator circuitries may be communicatively coupled to each other to allow them to be connected over an interface 1103 if ports are configured to be connected. An interface 1101 between the host processing unit 1110 and the hardware accelerator circuitry 1121, 1122 may be an PCIe interface, for example, the interface allowing configuration of logical processing unit chains, data retrieval and data insertion.

The apparatus 1100 further comprises a communication interface 1130 comprising hardware and/or software for realizing communication connectivity according to one or more wireless and/or wired communication protocols. The communication interface 1130 may provide the apparatus with radio communication capabilities with different apparatuses, as well as communication capabilities towards the core network.

In an embodiment, at least some of the functionalities of the apparatus of FIG. 1100 may be shared between two physically separate apparatuses, forming one operational entity. Therefore, the apparatus 1100 may be seen to depict the operational entity comprising one or more physically separate apparatuses for executing at least some of the processes described above.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, examples are listed above. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods and processes described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising
at least one central processing unit;
at least one further processing unit;
at least one memory including computer program code, the at least one memory and computer program code configured to, with the processing units, cause the apparatus at least to perform:
querying from the at least one further processing unit, per a further processing unit, information relating to chaining possibilities of logical processing units in a pipeline abstraction instantiated, said information queried comprising at least a number of ports and per a port address information and information on a direction of the port;
configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and
offloading from the at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

2. The apparatus of claim 1, wherein the instantiated pipeline abstraction associates endpoints with one or more supported interface types and wherein the at least one memory and computer program code configured to, with the processing units, cause the apparatus at least to perform:
configuring, per an endpoint, an interface type to the endpoint based on the interface types in the instantiated pipeline abstraction.

3. The apparatus of claim 2, wherein the at least one memory and computer program code configured to, with the processing units, cause the apparatus at least to perform:
allowing data insertion from the at least one central processing units via an endpoint having interface type supporting data to be inserted; and
allowing data retrieval via an endpoint having interface type supporting data to be retrieved.

4. The apparatus of claim 2, wherein the at least one memory and computer program code configured to, with the processing units, cause the apparatus at least to perform:
determining, when a direction of an endpoint provides an ingress interface, the interface type from a group comprising at least a burst data queue interface type allowing data to be transferred in a block with configurable size, a streaming data interface type allowing data to be transferred in a fixed size and in a fixed interval, the size and the interval being configurable, and a timing/clocking interface type, allowing use of a timing signal with configurable frequency and duty cycle;
determining, when a direction of an endpoint provides an egress interface, the interface type from a group comprising the burst data queue interface type, the streaming data interface type, the timing/clocking interface type and an asynchronous event/data queue with callback interface type allows transfer of data/event asynchronously when the data/event is available and includes a preregistered callback function that is called when the data/event is available.

5. The apparatus of claim 1, wherein the at least one memory and computer program code configured to, with the processing units, cause the apparatus at least to perform the configuring over an application programming interface.

6. The apparatus of claim 1, wherein the at least one memory and computer program code configured to, with the processing units, cause the apparatus at least to perform, prior to instantiating the pipeline abstraction:
checking, in response to receiving an instantiation request comprising a pipeline abstraction, implementation options for the pipeline abstraction;
selecting, when two or more implementation options are found during the checking, one of the implementation options; and
instantiating the pipeline abstraction using selected implementation option.

7. The apparatus of claim 1, wherein the at least one memory and computer program code configured to, with the processing units, cause the apparatus at least to perform, prior to instantiating the pipeline abstraction:
checking, in response to receiving an instantiation request comprising a pipeline abstraction, implementation options for the pipeline abstraction;
causing forwarding, when two or more implementation options are found during the checking, the implementation options towards an apparatus wherefrom the pipeline abstraction originated;
receiving information on a selected implementation option amongst the two or more implementation options; and
instantiating the pipeline abstraction using the selected implementation option.

8. The apparatus of claim 6, wherein the pipeline abstraction represents the two or more implementation options in a uniform way.

9. The apparatus of claim 1, wherein the at least one memory and computer program code configured to, with the processing units, cause the processing units to establish direct physical connections for the interaction.

10. A method comprising:
querying from at least one further processing unit, per a further processing unit, information relating to chaining possibilities of logical processing units in a pipeline abstraction instantiated, said information queried comprising at least a number of ports and per a port address information and information on a direction of the port;
configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and
offloading from at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

11. The method of claim 10, further comprising:
configuring, per an endpoint, an interface type to the endpoint based on the interface types in the instantiated pipeline abstraction.

12. The method of claim 11, further comprising:
allowing data insertion from the at least one central processing units via an endpoint having interface type supporting data to be inserted; and
allowing data retrieval via an endpoint having interface type supporting data to be retrieved.

13. A non-transitory computer readable medium comprising program instructions stored thereon for performing at least following:
querying from at least one further processing unit, per a further processing unit, information relating to chaining possibilities of logical processing units in a pipeline abstraction instantiated, said information queried comprising at least a number of ports and per a port address information and information on a direction of the port;
configuring, using said information, per a logical processing unit to be chained, per an endpoint representing a port in the logical processing unit, at least a type of the endpoint, and address information whereto connect the endpoint, wherein the type of the endpoint is either a host port type or a logical processing unit type; and
offloading from at least one central processing units one or more functions to be performed by one or more of the at least one further processing unit by interacting with the one or more logical processing units via endpoints of the host port type and by interacting between logical processing units via endpoints of the logical processing unit port type, the interaction using the address information.

\* \* \* \* \*